June 1, 1926.
C. J. COBERLY
1,587,148
MEANS FOR LOCKING HOSE CONNECTION FIXTURES OF OXYACETYLENE TORCHES
Filed Jan. 2, 1924
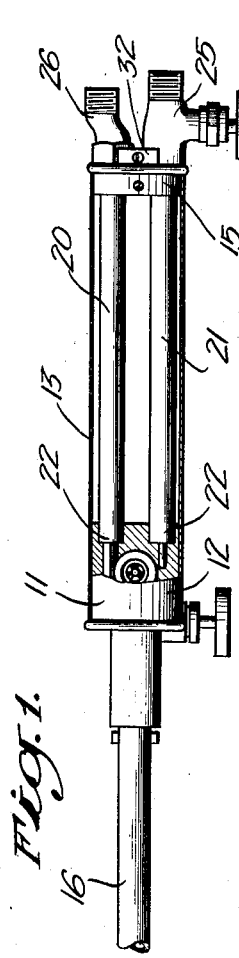
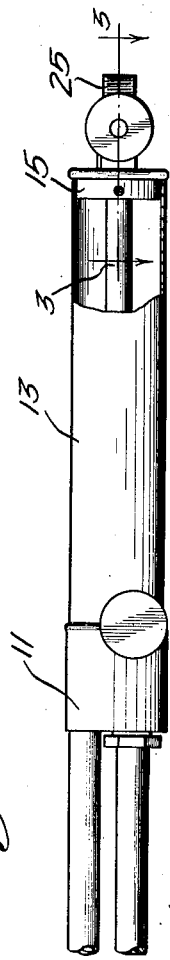
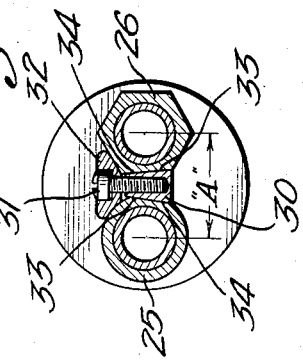
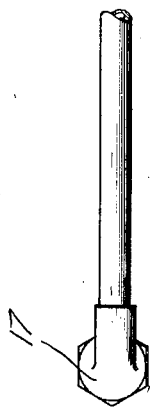
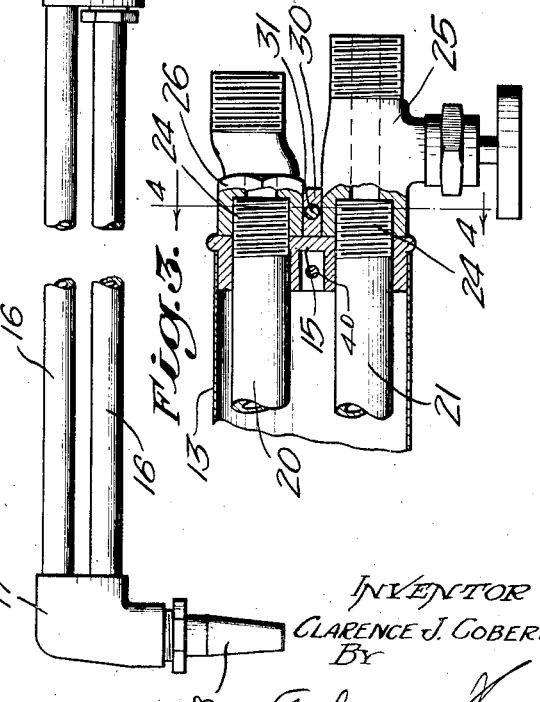
INVENTOR
CLARENCE J. COBERLY,
BY
Graham + Davis
ATTORNEYS.

Patented June 1, 1926.

1,587,148

UNITED STATES PATENT OFFICE.

CLARENCE J. COBERLY, OF LOS ANGELES, CALIFORNIA, ASSIGNOR, BY MESNE ASSIGNMENTS, TO PUROX COMPANY, OF DENVER, COLORADO, A CORPORATION OF COLORADO.

MEANS FOR LOCKING HOSE CONNECTION FIXTURES OF OXYACETYLENE TORCHES.

Application filed January 2, 1924. Serial No. 684,097.

This invention relates to the construction of oxy-acetylene welding and cutting torches or similar blow pipes in which several gases are combined to form a combustible mixture. The standard torches now employed in welding and cutting metals are constructed with a handle or grip portion from which there forwardly extend gas delivery tubes which lead to the welding or cutting tip. At the forward end of the grip, the mixing head is situated, in which head the gas mixing chambers are formed. The gases which are oxygen and acetylene in the particular torch considered, are delivered, from the flexible hose leading from the supply tanks to the mixing head, through tubes which extend within the grip portion of the torch and have the rearward ends threaded and projecting through end plates situated at the rearward end of the grip which generally is comprised of a tubular member which extends between the mixing head and the end plate.

Attachment fixtures which form part of the hose couplings, are secured upon the rearward ends of these tubes, it being customary to sweat them thereupon so that tight joints will be formed. In the attachment of the oxygen and acetylene delivery hose to the fixtures, excessive strain is often exerted in the threaded joints between the fixtures and the tubes which often causes the stripping of the threads and at times results in the twisting off of the tubes within the grip of the torch, thus necessitating costly repairs.

It is an object of my invention to provide a simple and effective means for preventing rotation of the attachment fixtures, thus locking these fixtures securely in place so that they can not be twisted off by manual application of force with the wrenches provided for the purpose of connecting the gas hose to the torch.

A further object of the invention is to transmit all torsional strains, caused by screwing on or off of hose couplings, directly to the grip of the torch. This feature of the invention relieves the gas tubes of all undue pressure.

The invention further provides an improved means for securing the torch grip in place.

The especial advantages of the invention and further objects thereof, will be made evident hereinafter.

Referring to the drawing, which is for illustrative purposes only:

Fig. 1 is a partially sectioned plan view of a cutting torch on which my improved locking means is employed.

Fig. 2 is a side elevation of the cutting torch.

Fig. 3 is an enlarged fragmentary section taken substantially upon the plane represented by the line 3—3 of Fig. 2.

Fig. 4 is a section taken upon a plane represented by the line 4—4 of Fig. 3.

The torch shown in the drawings is provided with a mixing head 11, having a cylindrical portion 12 over which extends the forward end of a tubular member 13 which constitutes the grip or handle of the torch. This grip member extends rearwardly and has an end plate 15 situated in the rearward end thereof. Forwardly from the mixing head, gas delivery tubes 16 extend to the burner head 17 in which the cutting tip 18 is placed.

The means for delivering the oxygen and acetylene gases to the mixing head, consists of an oxygen tube 20 and an acetylene tube 21, the forward ends 22 of which are secured in the mixing head in some suitable manner such as by being silver soldered, and which extend rearwardly within the grip member 13 and project through the end plate 15. The rearward ends 24 of the tubes 20 and 21 are threaded as indicated in Fig. 3 and attachment fixtures 25 and 26 are threaded thereupon as shown in this figure. Under ordinary conditions, torsion exerted upon either of the fixtures due to the placing or removal of the hose couplings, is transferred directly through the threaded joints to the tubular members so that the strain of screwing or unscrewing the hose coupling is exerted upon the threaded joints between the fixtures and the tubular members or upon the tubular members themselves.

My invention as hereinbefore stated, has for its object to provide a means for preventing rotation of the attachment fixtures 25 and 26, thus relieving the threaded joints and the tubular members 20 and 21 of strain and effectively preventing their being twisted off as is now often done. This I accomplish by bridging between the fixtures 25 and 26 in such a manner that a rotative force applied to one of the fixtures will be resisted by the shearing strength of the other fixture, as when this bridge is in place, one fixture cannot be rotated without the bridge causing the shearing off of the other fixture.

As shown in Figs. 3 and 4, I employ for this purpose a wedge member 30 which is drawn tightly into place and held securely in position by a screw 31 which extends through a plate 32. The sloping faces 33 of the wedge 30 rest against angularly disposed faces 34 formed on the fixtures 25 and 26. These faces may be formed before the fixtures are screwed in place or may be cut therein after the fixtures have been screwed tightly in place. It is desirable to form the under side of the plate 32 so that it will adhere to the contour of the members 25 and 26 against which it bears, thus cooperating with the wedge member in bridging between the fixtures.

It will be readily seen that when a rotative force is applied to the fixture 25, the engagement of the cooperating faces of the fixture 25 and the wedge 30 and cap 32, will exert a pressure against the fixture 26 which is resisted by the shearing strength of the rearwardly projecting end of the tubular member 20. The distance "A" between the centers of the fixtures provides a leverage upon which the shearing strength of either tubular member may act against the rotation of the other fixture in the form of a resisting moment of force which is more than ample to prevent the rotation of the fixture.

The end plate 15 forms a part of the grip 13, being riveted thereto by rivets 40. A torsion applied to either fixture 25 or 26 is thereby transmitted directly to the grip which is customarily held in one hand of the operator while a wrench is employed by the other hand for screwing the hose couplings.

As will be seen clearly from Fig. 3, the fixtures 25 and 26 screw tightly against the plate 15 with the result that the tubular grip portion 13 is clamped between the mixing head 11 and the plate 15. The end pressure thus applied to the grip 13 causes it to be firmly held in place.

I claim as my invention:

1. In a device of the character described, the combination of: a grip; tubes extending outwardly from said grip; attachment members on the outer ends of said tubes; and means preventing independent rotation of either of said members, the parts cooperating to cause rotative forces applied to said attachment members to be transmitted to said grip, said means being secured in place by engagement only with said members.

2. In a device of the character described, the combination of: a grip; tubes extending outwardly from said grip; attachment members on the outer ends of said tubes; and means, bridging between said attachment members, to prevent independent rotation of either of said members, the parts cooperating to cause rotative forces applied to said attachment members to be transmitted to said grip, said means being secured in place by engagement only with said members.

3. In a device of the character described, the combination of: a grip; tubes extending outwardly from said grip; hose attachment members on the outer ends of said tubes; and means bridging between said hose attachment members in such a manner that a torsion applied to one of said hose attachment members is resisted by the other of said attachment members, said means being secured in place by engagement only with said members.

4. In a device of the character described, the combination of: a grip; tubes extending from said grip; hose attachment members on the outer ends of said tubes, said attachment members having inwardly disposed flattened surfaces; and means consisting of wedge members operating between said flattened surfaces, for bridging between said hose attachment members in such a manner that a torsion applied to one of said hose attachment members is resisted by the other of said attachment members.

5. In a torch construction, the combination of: a supporting body; tubes extending from said body; a grip member extending over said tubes; a head member in the end of said grip member, the ends of said tubes extending entirely through said head member; hose attachment members on the ends of said tubes; and wedge means for locking said members against independent rotation, the parts cooperating to transmit to said grip, rotative forces applied to said attachment members, said means including a wedge-shaped element.

6. In a torch construction, the combination of: a supporting body; tubes extending from said body; a grip member extending over said tubes; a head member in the end of said grip member, the ends of said tubes extending entirely through said head member; hose attachment members on the ends of said tubes; and means for locking said members against independent rotation, the parts cooperating to transmit to said grip rotative forces applied to said attachment members, said means comprising a wedge having a threaded aperture and adapted to fit between said attachment members, a second wedge having a screw opening therethrough and adapted to cooperate with said first named wedge for exerting an opposite pressure on said attachment members, and a screw for securing said wedges together.

7. In a torch construction, the combination of: a supporting body; tubes extending from said body; a grip member extending over said tubes; a head member in the end of said grip member, the end of said tubes extending entirely through said head member; hose attachment members on the ends of said tubes; and a pair of wedge-shaped elements cooperating to lock said members against independent rotation, the parts cooperating to transmit to said grip rotative forces applied to said attachment members.

In testimony whereof, I have hereunto set my hand at Los Angeles, California, this 21st day of December, 1923.

CLARENCE J. COBERLY.